UNITED STATES PATENT OFFICE.

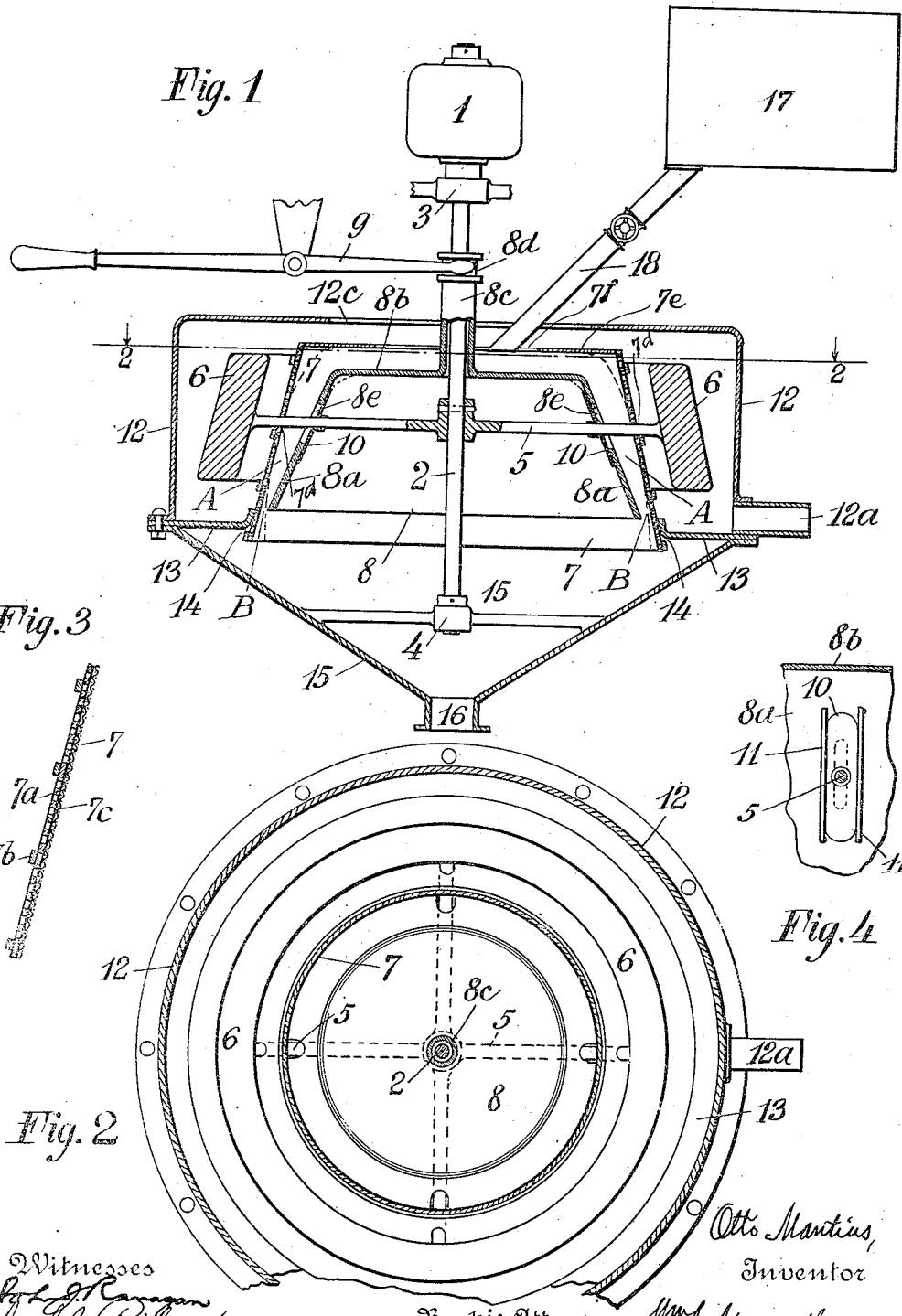

OTTO MANTIUS, OF PHILADELPHIA, PENNSYLVANIA.

CONTINUOUS-OPERATING CENTRIFUGAL MACHINE.

1,055,643.   Specification of Letters Patent.   Patented Mar. 11, 1913.

Application filed May 29, 1909. Serial No. 499,195.

*To all whom it may concern:*

Be it known that I, OTTO MANTIUS, a subject of the Emperor of Germany, and a resident of the city of Philadelphia, county of Philadelphia, State of Pennsylvania, United States of America, have invented certain new and useful Improvements in Continuous-Operating Centrifugal Machines, of which the following is a specification.

My invention relates to improvements in continuously operating centrifugal machines, and has for one of its objects to produce a centrifugal machine that may be continuously operated and be prevented from vibrating when the material is not evenly charged thereto or discharged therefrom.

Another object is to produce a machine in which the basket may be cone-shaped or curved.

Other objects will appear from the following description.

The invention is fully set forth in the following description taken in connection with the accompanying drawing which forms part of this application and in which the same reference character indicates the same part in the several views.

Referring to the drawing, Figure 1 is a vertical section through the center of the machine. Fig. 2 is a section on line 2 of Fig. 1. Fig. 3 is an enlarged detail view in cross section of the wall of the basket. Fig. 4 is a detail view.

The part marked 1 on the drawing represents an electric motor or other source of power which is connected to the driving shaft 2 of the centrifugal machine. This shaft is mounted in bearings 3 and 4.

5 is a spider which is secured to the shaft 2 and rotates therewith.

6 is a fly wheel rigidly secured to the arms of the spider.

7 is a "basket" the wall of which is preferably in the shape of a frustum of a cone or curved. This basket consists of a perforated plate $7^a$ strengthened on the outside by hoops or rings $7^b$. Secured to the inside of this plate is a wire screen $7^c$. The arms of the spider pass through openings $7^d$ in the wall of the basket. The top of the basket may be closed by an annular plate $7^e$ having an annular opening $7^f$ therein. This plate may be formed integral with the wall of the basket, forming an inwardly projecting flange, or may be a separate plate secured thereto. I use this plate for the purpose hereinafter stated.

8 is a member located inside of the basket and consists of an inclined annular wall $8^a$ and a flat top or cover $8^b$. The wall $8^a$ is at a greater inclination than the wall of the basket so that there is a space A between the inner and outer walls of the basket and an outlet passage B between the lower edge of said wall $8^a$ and the inner wall of the basket. Connected to this top or cover is a sleeve $8^c$ which surrounds the shaft 2. This sleeve is provided with a collar $8^d$ to which is connected the inner end of an adjusting lever 9. The walls of the member 8 are provided with slots $8^e$ through which project the arms of the spider 5. Carried by said arms of the spider are plates 10 which cover the opening $8^e$, said plates being movable in suitable guides 11.

12 is an outer jacket or casing which incloses the movable parts of the machine. This casing has an outlet $12^a$ in the lower side thereof and an opening $12^c$ in the top. The bottom of this casing is closed by an annular plate 13 which has an annular opening 14 in the center thereof, the inner edges of this bottom being upturned as shown. The lower end of the basket 7 projects through this opening but it is free to rotate therein.

15 is a hopper secured to the bottom of the casing and provided with an outlet 16.

17 is a supply tank located above the machine and provided with an outlet pipe 18. The lower end of said pipe projects through the opening $12^c$ and extends over the top $8^b$ of the member 8.

The machine is operated as follows: First, the member 8 is raised or lowered so that the opening B is adjusted to the proper size for the material being separated. The raising of the member 8 is accomplished by the lever 9. The slot $8^e$ in the wall of this member 8 permits it to have vertical movement relative to the arms of the spider, the openings in the wall being closed by the slide 10 which is fastened to the arms of the spider. When the opening is properly adjusted, the motor 1 is put in motion and the shaft 2 is rotated. The spider being connected to the shaft, the rotation of the shaft will cause rotation of the member 8, the basket 7 and the fly wheel 6. The material to be separated having been placed in the supply tank 17 is fed through the pipe 18 onto the top 8<sup>b</sup> of the member 8. The machine being rotated at high speed, the material to be separated is thrown by centrifugal force from the top 8<sup>b</sup> against the inner wall of the basket 7, the liquor is forced through the screen 7<sup>c</sup> and the perforation 7<sup>a</sup> in the wall of the basket against the inner side of the housing 12. It runs down the side of the housing and is discharged through the outlet 12<sup>a</sup>. The solid material held back by the screen 7<sup>c</sup> will run down the wall of the basket through the opening B and when it reaches the lower edge of the basket it will be thrown by centrifugal force from the basket against the inner wall of the hopper 15 and be discharged through the opening 16. The adjustment of the member 8, of course, may be made during the running of the machine.

The inclination of the wall of the basket will vary and depend on the friction of the material being separated. The fly wheel is made very heavy and weighs from twenty to fifty times as much as the amount of solids retained on the inside of the basket of the machine. This is to prevent vibrations in the machine when the material is not evenly charged or discharged or when unevenly distributed on the side of the basket. The uneven distribution of the material will amount only to a small percentage of the total rotating weight in the fly wheel 6.

By providing the basket with the cover 7<sup>e</sup> I may feed the liquor from the tank 17 in such quantity that said liquor will fill the space A between the wall of the basket and the wall of the member 8, and bank up at the upper end of this space. The cover or plate 7<sup>e</sup> will hold the banked up material within the basket and prevent it from being thrown out over the upper edge of the basket by centrifugal force. Then, by regulating the amount of flow of liquor supplied to the basket I can keep the liquor in the space A up to a certain predetermined point. The weight of the liquor in this space tends to force the solids through the opening B and the amount of banked up material can be varied so as to vary the speed at which to force out the solids through the opening B, and in this way the dryness of the material can be varied.

Instead of making the wall of the basket and the member 8 inclined on a straight line, the same may be curved with their lower edges converging as previously described, as shown in dotted lines, Fig. 1.

As many changes could be made in the above construction and many apparently widely different embodiments of my invention could be made without departing from the scope thereof, I intend that all matter contained in the above description or shown in the accompanying drawing shall be interpreted as illustrative and not in a limiting sense. I desire it also to be understood that the language used in the following claims is intended to cover all of the generic and specific features of the invention herein described and all statements of the scope of the invention, which, as a matter of language, might be said to fall therebetween.

Having now described my invention, what I claim as new and desire to secure by Letters Patent is:

1. In a centrifugal machine, a basket, a member inside of the basket, means for delivering on or against said member material to be separated, means for driving the said member and basket, and gyrostatic means rigidly connected to the basket for keeping the basket in balance while the material is being charged into or discharged therefrom.

2. In a centrifugal machine, a basket, a member inside of the basket, means for delivering on or against said member material to be separated, means for driving the said member and basket, and means rigidly connected to the basket for keeping the basket in balance while the material is being charged into or discharged from the basket.

3. In a centrifugal machine, a perforated basket, means for rotating the basket, a positively-centered annular weight connected to the basket and rotating therewith, the annular weight being several times heavier than the weight of the material carried by the basket.

4. In a centrifugal machine, a perforated basket, means for rotating the basket, a positively centered annular weight rigidly connected to the basket and rotating therewith, the said weight being several times heavier than that of the material carried by the basket.

5. In a centrifugal machine, a basket, a member inside of the basket having a flat top on which the material to be separated is charged, and an annular weight outside of, connected to and rotating with the basket.

6. In a centrifugal machine, a shaft, a spider connected to the shaft, a basket having an inclined perforated annular wall connected to the spider, a member inside of the basket having an annular inclined wall and a flat top, said member being connected to the spider, an annular weight surrounding the basket and connected to the spider, and means for charging material to the top of said member.

7. In a centrifugal machine, a power driven shaft, a spider connected thereto, a perforated basket connected to the spider, said basket having an annular inclined wall, an adjustable member inside of the basket and connected to the spider, said member having an annular wall inclined at a greater angle than the wall of the basket and having a flat top, an annular weight outside of the basket and connected to the spider, a casing outside of the annular weight having a discharge opening therein, and means for charging material to the plate of said member.

8. In a centrifugal machine, a shaft having an inclined, annular, perforated wall connected to the shaft, a member inside of the basket having an annular wall inclined at a greater angle than the inclination of the basket and having a flat top, said member being connected to the shaft and adjusted longitudinally relative to the basket, and a fly wheel connected to the shaft, said fly wheel being of greater weight than the material contained in the basket.

9. In a centrifugal machine, a rotating shaft, a perforated basket having an inclined wall secured to the shaft, a screen secured to the inner wall of the basket, a member inside of the basket and secured to the shaft, said member having a wall inclined at a greater angle than the wall of the basket and having a flat top on which the material to be separated is delivered, an annular weight outside of the basket and secured to the shaft, a casing surrounding the movable parts of the machine, said casing having an opening in the top thereof through which the material to be separated is delivered, a bottom in said casing having an annular opening therein through which the lower edge of the wall of the basket projects, and an outlet in said casing.

10. In a centrifugal machine, a rotating shaft, a perforated basket having an inclined wall secured to the shaft, a screen secured to the inner wall of the basket, a member inside of the basket and secured to the shaft, said member having a wall inclined at a greater angle than the wall of the basket and having a flat top on which the material to be separated is delivered, an annular weight outside of the basket and secured to the shaft, a casing surrounding the movable parts of the machine, said casing having an opening in the top thereof through which the material to be separated is delivered, a bottom in said casing having an annular opening therein through which the lower edge of the wall of the basket projects, an outlet in said casing, and a hopper having an outlet therein connected to the casing below the basket.

11. In a centrifugal machine, a rotary shaft, a basket secured to said shaft, and a weight secured to and positively centered on said shaft, said weight being many times heavier than the contents contained in the basket.

In witness whereof I have hereunto set my hand in the city, county and State of New York, this 26th day of April, 1909.

OTTO MANTIUS.

In presence of—
 AGNES C. O'CONNELL,
 ISABEL R. RICHARDS.

---

Copies of this patent may be obtained for five cents each, by addressing the "Commissioner of Patents, Washington, D. C."